United States Patent [19]
Gee

[11] Patent Number: 5,925,469
[45] Date of Patent: Jul. 20, 1999

[54] ORGANOPOLYSILOXANE EMULSIONS

[75] Inventor: Ronald Paul Gee, Midland, Mich.

[73] Assignee: Dow Corning Corporation, Midland, Mich.

[21] Appl. No.: 08/993,552

[22] Filed: Dec. 18, 1997

[51] Int. Cl.$^6$ ............................... B32B 9/04; C08J 83/06
[52] U.S. Cl. ..................... 428/447; 524/837; 524/773; 524/759; 524/760; 524/731
[58] Field of Search ..................... 524/837, 773, 524/759, 766, 731

[56] References Cited

U.S. PATENT DOCUMENTS

| | | | |
|---|---|---|---|
| 2,891,920 | 6/1959 | Hyde et al. | 260/29.2 |
| 3,294,725 | 12/1966 | Findlay et al. | 260/29.2 |
| 3,433,780 | 3/1969 | Cekada et al. | 260/29.2 |
| 3,455,877 | 7/1969 | Plueddemann | 260/46.5 |
| 4,999,398 | 3/1991 | Graiver et al. | 524/837 |
| 5,726,270 | 3/1998 | Craig | 528/23 |
| 5,789,517 | 8/1998 | Ochiai et al. | 528/21 |

FOREIGN PATENT DOCUMENTS

| | | |
|---|---|---|
| 459 500 | 5/1991 | European Pat. Off. . |
| 4-327273 | 11/1992 | Japan . |

OTHER PUBLICATIONS

Qiang Xihui and Xu Xuecheng. "Emulsion Polymerization of D4 Anion in the Presence of Nonionic Emulsifier." Xibei Qingongye Xueyuan Xuebao, No. 4, pp.5–10, Dec., 1987.

*Primary Examiner*—Robert Dawson
*Assistant Examiner*—Caixia Lu-Rutt
*Attorney, Agent, or Firm*—Timothy J. Troy

[57] ABSTRACT

This invention relates to 1,2-diol functional polysiloxane emulsions obtained by a variety of polymerization methods. This invention further relates to an organopolysiloxane emulsion comprising an organopolysiloxane polymer having pendant organic diol groups, at least one nonionic surfactant, at least one anionic surfactant, and water. The emulsions of this invention are useful as fiber treatment agents and provide softness and hydrophilicity to fibers treated with the emulsion.

10 Claims, No Drawings

ORGANOPOLYSILOXANE EMULSIONS

BACKGROUND OF THE INVENTION

This invention relates to organopolysiloxane emulsions. More particularly this invention relates to 1,2-diol functional organopolysiloxane emulsions. This invention also relates to 1,2-diol functional organopolysiloxane emulsions which can be prepared by a variety of methods.

Emulsions are mixtures of at least two components which are substantially immiscible in each other, and a surfactant which stabilizes the particles of one component against coalescence when dispersed in the other component. A microscopic view of aqueous emulsions reveals two phases, an oil phase and a water phase. The emulsion can be characterized as an oil-in-water emulsion or a water-in-oil emulsion. The chief distinction between the two being which component, the oil or water phase, comprises the continuous portion of the emulsion. The noncontinuous phase is in the form of droplets in the other phase.

Polysiloxane emulsions may be categorized by the size of the polysiloxane particles and the appearance of the emulsion. Typically three categories of silicone emulsions are recognized in the art: standard emulsions, fine emulsions, and microemulsions. The term "emulsion" as used herein encompasses the three individual types of silicone emulsions.

Silicone standard emulsions are characterized by a large particle size (typically greater than 300 nanometers) and appear to the human eye to be opaque (impenetrable to light). Silicone standard emulsions are most commonly identified as those having an intense white appearance. Silicone fine emulsions are characterized by a smaller particle size, from 300 to 140 nanometers, and are identified as those compositions which visually may be opaque to very slightly translucent (transmitting light but with distortion). Silicone microemulsions are characterized as those having a particle size of less than 140 nanometers and visually appear translucent to transparent (transmitting light without distortion).

Out of the three types of silicone emulsions, fine emulsions and microemulsions are the most desired due to their smaller particle size and higher stability. Microemulsions are further desired due to their translucent to transparent appearance.

Methods for making emulsions of polysiloxanes in water are well known in the art. The methods are generally classified in two categories: mechanical means and emulsion polymerization. Mechanical means usually entail taking the polysiloxane and using mechanical means such as homogenizers or vigorous agitation to emulsify the siloxanes in water. Typically a surfactant is added to the polysiloxane or water to aid the emulsification process.

Emulsion polymerization typically entails combining a reactive silicone oligomer, surfactant, polymerization catalyst and water. The mixture is stirred or emulsified and the silicone oligomers are allowed to polymerize until a standard emulsion, fine emulsion or microemulsion of polysiloxane is formed. Typically alkoxysilanes, which result in the formation of microemulsions, or cyclosiloxanes, which result in the formation of fine and standard emulsions are used as the reactive monomers and oligomers.

Typical problems encountered with emulsion polymerization of cyclosiloxanes include the presence of an unemulsified silicone oil layer or very large (visible to the human eye) silicone oil droplets in the final emulsion produced. Using methods known in the art, complete elimination of the silicone oil layer is not achieved unless the cyclosiloxane is pre-emulsified using mechanical means prior to polymerization. Mechanical pre-emulsification of the cyclosiloxanes in water prior to emulsion polymerization is a common, well known practice to those skilled in the art.

Silicone emulsions produced by emulsion polymerization have been disclosed in the art. For example U.S. Pat. No. 2,891,920 to Hyde et al. teaches an emulsion polymerization method where the siloxane oligomer, emulsifying agent (cationic, anionic or nonionic surfactant), catalyst and water are all blended together (in various orders) to form an emulsion and then allowed to react at room temperature or greater. It appears that it is possible to produce only standard and possibly fine emulsions by this method.

U.S. Pat. No. 3,294,725 to Findlay et al. teaches an emulsion polymerization method wherein a mechanically produced pre-emulsion is made of the siloxane in the presence of the catalyst. Heat is then applied to this emulsion and the siloxanes react to form the polysiloxane emulsion. Various sulfonic acids and their salts are taught as the catalysts for the polymerization. The catalysts also act as the emulsifying agent thereby eliminating the need for additional materials. The examples provided in the Findlay patent show that when cyclosiloxanes are employed as the starting material, less than 90% of the starting cyclosiloxanes are consumed after several days of reacting. It appears that only standard and fine emulsions can be produced by this method. The resulting emulsions however have a narrow distribution of particle sizes.

A method for preparing colloidal suspensions of silsesquioxanes is taught in U.S. Pat. No. 3,433,780 to Cekada et al. These colloidal suspensions have an extremely small particle size (10 nanometers to 100 nanometers) and in most cases contain less than 25% by weight of the silsesquioxane. The method comprises combining the water and catalyst, heating the water solution (optional) and rapidly or slowly adding a trialkoxysilane to the water solution. When rapid addition is employed the suspension can contain up to 10% by weight of the silsesquioxane. Silsesquioxane are materials which contain 3 Si—O bonds per molecule.

Several papers have been published in China on studies of silicone emulsion polymerization using cationic surfactants and in some experiments, additionally using nonionic surfactants. A paper published by Northwestern University of Light Industry, China, Xibei Qingongye Xueyuan Xuebao, No. 4, pp. 5–10, December 1987, discusses the improved stability of emulsion produced using a nonionic surfactant and an anionic surfactant.

Additionally, two papers, Institute of Chemistry, Academia Sinica, Beijing, China, Polymer Communications, No. 4, August 1982, pp. 266–270 and pp. 310–313, report on the mechanism of cationic emulsion polymerization and the effect of temperature on cationic emulsion polymerization, respectively.

Gravier et al. in U.S. Pat. No. 4,999,398 discloses a clear stable, stable, aqueous microemulsion of polydiorganosiloxane produced by a method which comprises sequentially adding a precursor emulsion comprised of a cyclopolydiorganosiloxane, surfactant, and water, to a polymerization medium comprised of water and an effective amount of a polymerization catalyst while mixing. During this process the cyclosiloxane monomer particles are consumed and new much smaller polysiloxane polymers particles are formed.

Japanese Patent Application Publication No. 04-327,273 (327,273/1992) discloses a fiber treatment agent which is an organopolysiloxane which contains an aminoalkyl group and a triglycerol group, and further discloses that this organopolysiloxane can be dispersed in water with a surfactant to form an emulsion.

European Patent No. 0459500 discloses a method for making oil free polysiloxane standard emulsions, fine emulsions, or microemulsions using emulsion polymerization, the method comprising reacting a cyclosiloxane in the presence of a catalyst, ionic surfactant, and nonionic surfactant. EP'500 further discloses that emulsions containing siloxane copolymers can also be produced using this method. This patent teaches a method for controlling particle size produced during emulsion polymerization.

The methods known in the art using emulsion polymerization however do not disclose the use of at least one epoxy functional silane to produce an emulsion of siloxane polymer containing pendant organic 1,2-diol groups. Further, the methods known in the art do not disclose the use of such an emulsion of 1,2-diol functional polysiloxane as a fiber treatment agent to provide improved sensory feel and which retains or provides hydrophilicity of the treated substrate.

SUMMARY OF THE INVENTION

This invention relates to 1,2-diol functional polysiloxane emulsions obtained by a method comprising (I) heating and agitating a mixture comprising (a) at least one cyclosiloxane, (b) at least one epoxy functional alkoxysilane, (c) at least one nonionic surfactant, (d) at least one anionic surfactant, (e) water, and (f) optionally a strong acid condensation polymerization catalyst.

This invention also relates to a 1,2-diol functional polysiloxane emulsion obtained by a method comprising (I) mixing (a) at least one cyclosiloxane, (b) at least one anionic surfactant, (c) water, and optionally (d) a strong acid condensation polymerization catalyst, (II) mechanically emulsifying the product of (I), (III) heating the product of (II), (IV) adding (e) at least one epoxy functional alkoxysilane to the product of (III), optionally (V) heating the product of (IV), and (VI) adding (f) at least one nonionic surfactant during step (I) or after step (IV).

This invention also relates to a 1,2-diol functional polysiloxane emulsion obtained by a method comprising (I) mixing (a) at least one anionic surfactant, (b) water, (c) at least one epoxy functional alkoxysilane, and (d) a hydroxyl-endblocked polydiorganosiloxane, and optionally (e) a strong acid condensation polymerization catalyst, (II) mechanically emulsifying the product of (I), optionally (III) heating the product of (II), and (IV) adding (f) at least one nonionic surfactant during step (I) or after step (II).

This invention also relates to an organopolysiloxane emulsion comprising (A) a 1,2-diol functional polysiloxane, (B) at least one nonionic surfactant, (C) at least one anionic surfactant, and (D) water.

It is an object of this invention to provide a method for making emulsions of polysiloxanes containing pendant organic 1,2-diol groups using a variety of methods.

It is a further object of this invention to produce an emulsion of an organopolysiloxane polymer containing organic 1,2-diol groups which is useful as a fiber treatment agent.

DETAILED DESCRIPTION OF THE INVENTION

This invention relates to 1,2-diol functional polysiloxane emulsions obtained by a method comprising (I) heating and agitating a mixture or emulsion comprising (a) at least one cyclosiloxane, (b) at least one epoxy functional alkoxysilane, (c) at least one nonionic surfactant, (d) at least one anionic surfactant, (e) water, and optionally (f) a strong acid condensation polymerization catalyst.

Component (a) in this invention is at least one cyclosiloxane. Preferred cyclosiloxanes are polydiorganocyclosiloxanes which are generally insoluble in water and can be readily polymerized using emulsion polymerization techniques. Preferred cyclosiloxanes have the formula

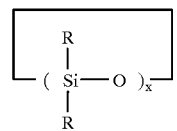

wherein each R is independently selected from the group consisting of saturated alkyl groups having from 1 to 6 carbon atoms, unsaturated alkyl groups having from 2 to 6 carbon atoms, aryl groups having from 6 to 10 carbon atoms and wherein any of said R groups can optionally contain a functional group which is unreactive in the ring opening and polymerization reaction; and x has a value of 3 to 7.

Thus R may be selected from the group consisting of methyl, ethyl, propyl, phenyl, allyl, vinyl, —$R^1$—F where $R^1$ is selected from the group consisting of an alkylene group having from 1 to 6 carbon atoms and an arylene group having from 6 to 10 carbon atoms, and F is a functional group such as an amine, diamine, halogen, carboxyl, or mercapto, and —$R^1$—$A^1$—R wherein $R^1$ and R are as described above and $A^1$ is a non-carbon atom such as oxygen, nitrogen, or sulfur.

Preferred cyclosiloxanes are exemplified by hexamethylcyclotrisiloxane, octamethylcyclotetrasiloxane, decamethylcyclopentasiloxane, tetramethyltetravinylcyclotetrasiloxane, tetramethyltetraphenylcyclotetrasiloxane, and others. Mixtures of the various cyclosiloxanes may also be used as component (a).

It is possible to produce copolymers through the emulsion polymerization reaction by having present in the reaction medium a small portion of other siloxane reactants. These siloxane reactants may be any compound that contains a hydrolyzable or silanol group and that is capable of polymerization using emulsion polymerization. It is preferred that these siloxane reactants comprise no more than 10 mole percent of the total silicone content.

Examples of the siloxane reactants include organofunctional siloxanes such as amine functional silanes, vinyl functional silanes, halogenalkyl functional silanes, and hydroxy endblocked polysiloxanes. These siloxane reactants are exemplified by silanol terminated polydimethysiloxanes with a degree of polymerization between 1 and 7, N-(2-aminoethyl)-3-aminopropyltrimethoxysilane, trimethoxyvinylsilane, tris-(2-methoxyethoxy)vinylsilane, and 3-chloropropyltrimethoxysilane.

Component (a) is typically present at levels of 10 to 70 weight percent of the total mixture or emulsion. The preferred levels are from 25 to 60 weight percent of the total mixture or emulsion.

Component (b) of this invention is at least one epoxy functional alkoxysilane. For purposes of this invention the term "epoxy group" denotes the group

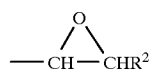

wherein R² is selected from the group consisting of a hydrogen atom and a monovalent hydrocarbon group having from 1 to 10 carbon atoms.

Suitable epoxy functional alkoxysilanes for this invention have formula

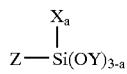

wherein Z denotes the group —Q—E where Q is a divalent hydrocarbon group, E is selected from the group consisting of an epoxy group and a cycloalkylepoxy group, X denotes a monovalent hydrocarbon group having 1 to 10 carbon atoms, Y denotes an alkyl group having 1 to 8 carbon atoms or an alkoxyalkyl group having 1 to 8 carbon atoms, and a has an average value of 0 to 2.

In the above formula, Q is a divalent hydrocarbon group exemplified by groups such as alkylene groups including methylene, ethylene, —CH₂CH(CH₃)—, propylene, —CH₂CH(CH₃)CH₂—, butylene, pentylene, trimethylene, 2-methyltrimethylene, pentamethylene, hexamethylene, 3-ethyl-hexamethylene, octamethylene, —(CH₂)₁₈—, and cycloalkylene radicals such as cyclohexylene, arylene radicals such as phenylene, combinations of divalent hydrocarbon radicals such as benzylene (—C₆H₄CH₂—), and alkyleneoxyalkylene groups exemplified by —CH₂—O—CH₂—, —CH₂—O—CH₂CH₂CH₂—, —CH₂CH₂—O—CH₂CH₂—, —CH₂CH₂CH₂—O—CH₂, —CH₂CH₂OCH(CH₃)CH₂—, —CH₂OCH₂CH₂OCH₂CH₂—, and —CH₂OCH₂CH₂OCH₂CH₂CH₂—. Preferred divalent hydrocarbon groups are those having from 1 to 8 carbon atoms. The cycloalkylepoxy group is exemplified by groups such as cyclohexylepoxy, cycloheptylepoxy, and alkyl substituted cyclohexylepoxy groups.

The group X is a monovalent hydrocarbon group having 1 to 10 carbon atoms exemplified by alkyl groups, such as methyl, ethyl, propyl, butyl, hexyl, octyl, and decyl, cycloaliphatic groups, such as cyclohexyl; aryl groups such as phenyl, and aralkyl groups, such as benzyl and phenylethyl. It is preferred that X is methyl or phenyl. The group Y in the above formula is exemplified by methyl, ethyl, propyl, butyl, hexyl, octyl, or methoxyethyl. Preferred epoxy functional alkoxysilanes are exemplified by compounds having the formula

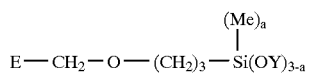

where Me denotes methyl, E is an epoxy group, Y is selected from the group consisting of methyl, ethyl, and methoxyethyl, and a has an average value of 0 to 1. Especially preferred as component (b) are 3-glycidoxypropyltrimethoxysilane, and 3-glycidoxypropylmethyldiethoxysilane. Many silanes of the type described above are known and are described in U.S. Pat. No. 3,455,877 which is hereby incorporated herein by reference to show suitable epoxy functional alkoxysilanes and the method for their preparation.

The epoxy functional alkoxysilane (b) is typically present at levels of 0.1 to 5 weight percent of the total emulsion. The preferred levels are from 0.5 to 3 weight percent of the total emulsion.

Component (c) in this invention is at least one nonionic surfactant. Nonionic surfactants useful in the method of the instant invention are those that have a hydrophilic-lipophilic balance (HLB) between 10 and 20. Nonionic surfactants with an HLB of less than 10 may be used in the instant invention, however, a hazy solution may result due to the limited solubility of the nonionic surfactant in water. It is preferred that when using a nonionic surfactant with an HLB of less than 10, that a nonionic surfactant with an HLB of greater than 10 also be added during or after polymerization. The preferred nonionic surfactants are those which are stable in the polymerization environment.

Examples of nonionic surfactants suitable as component (c) include polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene oxide-polypropylene oxide block copolymers, diethylene glycol, ethoxylated trimethylnonanols, and polyoxyalkylene glycol modified polysiloxane surfactants. Mixtures of nonionic surfactants may also be employed as component (c).

Preferred nonionic surfactants as component (c) in this invention are exemplified by 2,6,8 trimethyl-4-nonyloxypolyethyleneoxyethanol (6EO) (sold as Tergitol (TMN-6 by Union Carbide Corp., Danbury, Conn. 06817), 2,6,8-trimethyl-4-nonyloxypolyethyleneoxyethanol (10EO) (sold as Tergitol® TMN-10 by Union Carbide Corp., Danbury, Conn. 06817), alkyleneoxypolyethyleneoxyethanol (C11–15, secondary alkyl, 7EO) (sold as Tertitol® 15-S-7 by Union Carbide Corp., Danbury, Conn. 06817), alkyleneoxypolyethyleneoxyethanol (C11–15, secondary alkyl, 9EO) (sold as Tergitol® 15-S-9 by Union Carbide Corp., Danbury, Conn. 06817), alkyleneoxypolyethyleneoxyethanol (C11–15, secondary alkyl, 15EO) (sold as Tergitol® 15-S-15 by Union Carbide Corp., Danbury, Conn. 06817), octylphenoxypolyethoxyethanol (40EO) (sold as Triton® X405 by Rohm and Haas Co., Philadelphia, Pa.), nonylphenoxypolyethoxyethanol (10EO) (sold as Makon™ 10 by Stepan Co.), and polyoxyethylene-23-lauryl ether (sold as Brij® 35L by ICI Americas, Inc., Wilmington, Del. 19897).

Levels of nonionic surfactant (c) typically greater than 0 and less than 10 weight percent based on the weight of the total emulsion can be used in this invention. The preferable levels are from 0.5 to 5 weight percent based on the total weight of the emulsion.

Component (d) in this invention is at least one anionic surfactant. Anionic surfactants may be selected from any anionic surfactant known in the art as useful in emulsion polymerization. Examples of suitable anionic surfactants include alkali metal sulforicinates, sulfonated glyceryl esters of fatty acids such as sulfonated monoglycerides of coconut oil acids, salts of sulfonated monovalent alcohol esters such as sodium oleylisethionate, amides of amino sulfonic acids such as the sodium salt of oleyl methyl tauride, sulfonated products of fatty acids, nitriles such as palmitonitrile sulfonate, sulfonated aromatic hydrocarbons such as sodium alkylnaphthalene monosulfonate, condensation products of naphthalene sulfonic acids with formaldehyde, sodium octahydroanthracene sulfonate, alkali metal alkyl sulfates such as ammonium lauryl sulfate or triethanol amine lauryl sulfate, ether sulfates having alkyl groups of 8 or more carbon atoms such as sodium lauryl ether sulfate or sodium alkyl aryl ether sulfates, alkylarylsulfonates having 1 or more alkyl groups of 8 or more carbon atoms, alkylbenzenesulfonic acids which are exemplified by hexylbenzenesulfonic acid, octylbenzenesulfonic acid, decylbenzenesulfonic acid, dodecylbenzenesulfonic acid, cetylbenzenesulfonic acid, and myristylbenzenesulfonic acid, salts of alkylbenzenesulfonic acids, alkyltoluenesulfonic acids, alkylxylenesulfonic acids, sulfuric esters of polyoxyethylene alkyl ether including $CH_3(CH_2)_6CH_2O(C_2H_4O)_2SO_3H$, $CH_3(CH_2)_7CH_2O(C_2H_4O)_{3.5}SO_3H$, $CH_3(CH_2)_8CH_2O(C_2H_4O)_8SO_3H$, $CH_3(CH_2)_{19}CH_2O(C_2H_4O)_4SO_3H$, and $CH_3(CH_2)_{10}CH_2O(C_2H_4O)_6SO_3H$, sodium salts, potassium salts, and amine salts of alkylnaphthylsulfonic acid.

Anionic surfactants commercially available and useful in the instant invention are exemplified by dodecylbenzenesulfonic acid sold under the name Biosoft® S-100 by Stepan Co. and related salts such as the sodium salt of dodecylbenzensulfonic acid sold under the name Siponate™ DS-10 by Alcolac Inc.

The anionic surfactant (d) is typically present at levels of 0.05 to 30 weight percent of the total emulsion. The preferred levels are from 2 to 10 weight percent of the total emulsion.

Water, component (e) in this invention, is generally present at levels of 30 to 90 weight percent, and preferably from 45 to 65 weight percent of the total emulsion.

Component (f) in this invention is a strong acid condensation polymerization catalyst. The reaction to polymerize the silicones and form the emulsions is carried out in a reaction medium comprised of water, at least one nonionic surfactant, at least one anionic surfactant, and a strong acid condensation polymerization catalyst. Any strong acid catalyst that is capable of polymerizing cyclosiloxanes in the presence of water is useful in this invention. Strong acid condensation polymerization catalysts suitable for this reaction include those catalysts which are known as strong acid condensation polymerization catalysts and are capable of cleaving siloxane bonds and are exemplified by acids such as hydrochloric acid and sulfuric acid, alkylbenzenesulfonic acids, alkyltoluenesulfonic acids, alkylxylenesulfonic acids, and alkylsulfonic acids. In some instances, anionic surfactants which are strong acids as exemplified by dodecylbenzenesulfonic acid, can additionally function as the catalyst thus eliminating the need for a separate condensation polymerization catalyst.

The catalyst (f) is usually present at levels of up to 50 weight percent of the total mixture or emulsion, and preferably from 1 to 40 weight percent of the total mixture or emulsion. Typically the strong inorganic acids can be used within the lower end of this range while the anionic surfactants which can also function as the catalyst will be present at the higher end of this range.

The mixture of step (I) can further comprise a chain-terminating agent. The chain terminating agent can be any material which stops the growth of the chain polymerization in the above emulsion polymerization reaction. The chain-terminating agent is preferably selected from the group consisting of a silane having the formula $R^3R^4R^5Si(OR^6)$ and a disiloxane having the formula $(R^3R^4R^5Si)_2O$ wherein $R^3$, $R^4$ and $R^5$ are independently selected from the group consisting of hydrogen, alkyl groups having from 1 to 12 carbon atoms, alkenyl groups having from 2 to 12 carbon atoms, aryl groups, arylalkyl groups, and perfluoroalkylethyl groups having the formula $C_nF_{2n+1}CH_2CH_2$ where n has a value of 1 to 6 and $R^6$ is selected from the group consisting of hydrogen and alkyl groups having from 1 to 12 carbon atoms. The groups $R^3$, $R^4$, and $R^5$ can be the same or different as desired. Alkyl groups suitable as $R^3$, $R^4$, or $R^5$ in the disiloxane are exemplified by methyl, ethyl, propyl, butyl, hexyl, and octyl, aryl groups are exemplified by phenyl and naphthyl, arylalkyl groups are exemplified by phenylmethyl; phenylethyl, phenylpropyl, phenylhexyl, and phenyloctyl, and perfluoroalkylethyl groups include perflouromethylethyl, perfluorodiethyl, perflourobutylethyl, and perfluorooctylethyl. Alkenyl groups suitable as $R^3$, $R^4$, or $R^5$ are exemplified by vinyl and 5-hexenyl. Suitable disiloxanes are exemplified by tetramethyldisiloxane, hexamethyldisiloxane, tetramethyldivinylsiloxane, tetramethyldi-5-hexenylsiloxane, tetramethyl-3,3,3-trifluoropropyldisiloxane, tetramethyldiethylsiloxane, tetramethyldiphenyldisiloxane, and diethyldiphenyldivinyldisiloxane. A mixture of two or more species of disiloxane can also be used. Preferably the disiloxane is hexamethyldisiloxane or divinyltetramethyldisiloxane.

The chain-terminating agent is generally present at levels of up to 2 weight percent, and preferably from 0.1 to 0.5 weight percent of the total emulsion.

The method of this invention is preferably carried out by preparing a mixture comprising at least one cyclosiloxane, at least one epoxy functional alkoxysilane, at least one anionic surfactant, at least one nonionic surfactant, water, and optionally a strong acid condensation polymerization catalyst. The mixture is then heated with agitation at a polymerization reaction temperature until essentially all of the cyclosiloxane is reacted and a stable, oil-free emulsion is formed. The time required for formation of the stable, oil-free emulsion will vary depending on the reactants, amount of reactants, and the reaction conditions.

The mixture of at least one cyclosiloxane, at least one epoxy functional alkoxysilane, at least one anionic surfactant, at least one nonionic surfactant, water, and optionally catalyst is not stable and will separate without some means of agitation. It is not necessary to have all of the cyclosiloxane fully dispersed into the mixture during the reaction, however, some means of agitation must be provided throughout the course of the reaction.

Combining at least one cyclosiloxane, at least one epoxy functional alkoxysilane, at least one anionic surfactant, at least one nonionic surfactant, water, and catalyst and then reacting the cyclosiloxane to form the emulsion can take place in several ways. The first of these ways is to combine all of the ingredients with agitation, in any given order, and heat to the desired polymerization temperature with agitation thereby allowing the cyclosiloxane to react and form an emulsion. Another way is to combine all of the ingredients with agitation, except for the catalyst, heat to the desired polymerization temperature, add the catalyst and thereafter heat and agitate at the desired polymerization temperature thereby allowing the cyclosiloxane to react and form an emulsion. Another way is to combine all of the ingredients with agitation, except for the cyclosiloxane, heat to the desired polymerization temperature, add or feed in the cyclosiloxane and thereafter heat and agitate at the desired polymerization temperature thereby allowing the cyclosiloxane to react and form an emulsion.

It is not essential that the ingredients used in producing the emulsions by the method of this invention be combined in any given order. However, it is essential to have agitation during and following the addition of the ingredients and to have achieved or to heat to the polymerization temperature when all of the ingredients have been combined.

The preferred method for forming the emulsions of this invention is to create a mixture by combining at least one nonionic surfactant, at least one anionic surfactant, catalyst, and water, providing agitation such that the surfactants are completely dissolved, heating to the polymerization temperature, and next adding or feeding in at least one cyclosiloxane as a primary reaction phase. Next, adding a mixture of at least one cyclosiloxane and at least one epoxy functional alkoxysilane at the polymerization temperature as a secondary reaction phase. The mixture is then held at the polymerization temperature with agitation until a stable, oil-free emulsion is formed.

The method of this invention may also be carried out by combining and mechanically emulsifying at least one cyclosiloxane, at least one epoxy functional alkoxysilane, at least one nonionic surfactant, and water. Additional water, an anionic surfactant, catalyst, and additional nonionic surfactant can then be added to the pre-emulsion with agitation. The mixture is then heated to the polymerization reaction temperature and held optionally with agitation until the cyclosiloxane is consumed in forming the emulsion. Because of the formation and stability of the pre-emulsion it is not necessary to have agitation during the course of the polymerization reaction.

Polymerization reaction temperatures useful in the method of the instant invention are typically above the freezing point but below the boiling point of water. Pressures above or below atmospheric pressure may allow operation outside of this range. At lower temperatures, especially those below room temperature, the polymerization reaction may proceed more slowly. The preferred temperature range is to have a temperature of at least 40° C. but less than 100° C.

The polymerization reaction can be stopped at the desired level of conversion of cyclosiloxane and/or particle size by using methods known in the art. It is preferred to stop the reaction when the largest amount of cyclosiloxane has been reacted or when ring/chain equilibrium for the system and the desired particle size have been obtained. Reaction times of less than 24 hours, and typically less than 5 hours, are sufficient to achieve the desired particle size and/or level of conversion. The methods for stopping the reaction typically encompass neutralization of the catalyst by the addition of equal or slightly greater stoichiometric amount of base. Either a strong or weak base may be used to neutralize the reaction. Care must be taken when using a strong base not to over neutralize as it may be possible to re-catalyze the reaction. It is preferred to neutralize with sufficient quantities of base such that the resulting emulsion has a pH of greater than 7.

This invention also relates to a 1,2-diol functional polysiloxane emulsion obtained by a method comprising (I) mixing (a) at least one cyclosiloxane, (b) at least one anionic surfactant, (c) water, and optionally (d) a strong acid condensation polymerization catalyst, (II) mechanically emulsifying the product of (I), (III) heating the product of (II), (IV) adding (e) at least one epoxy functional alkoxysilane to the product of (III), optionally (V) heating the product of (IV), and (VI) adding (f) at least one nonionic surfactant during step (I) or after step (IV).

The cyclosiloxane, anionic surfactant, water, nonionic surfactant, strong acid condensation polymerization catalyst, and epoxy functional alkoxysilane are as described above including preferred embodiments and amounts thereof. In step (III), the product of (II) is preferably heated at a temperature of at least 40° C. but less than 100° C. In optional step (V), the product of (IV) is also preferably heated at a temperature of at least 40° C. but less than 100° C. The mechanical emulsification can be conducted by utilizing homogenizers, colloid mills, or other means of vigorous agitation to emulsify the siloxanes in water.

This invention also relates to a 1,2-diol functional polysiloxane emulsion obtained by a method comprising (I) mixing (a) at least one anionic surfactant, (b) water, (c) at least one epoxy functional alkoxysilane, and (d) a hydroxyl-endblocked polydiorganosiloxane, and optionally (e) a strong acid condensation polymerization catalyst, (II) mechanically emulsifying the product of (I), optionally (III) heating the product of (II), and (IV) adding (f) at least one nonionic surfactant during step (I) or after step (II).

The anionic surfactant, water, epoxy functional alkoxysilane, strong acid condensation polymerization catalyst, and nonionic surfactant are as described above including preferred embodiments and amounts thereof.

Component (d) in this method of the invention is a hydroxyl-endblocked polydiorganosiloxane. Component (d) is preferably a hydroxyl-endblocked polydiorganosiloxane polymer having the formula:

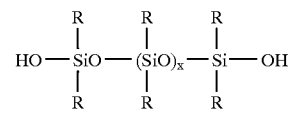

wherein R is monovalent hydrocarbon radical and x has a value from 10 to 100.

The monovalent hydrocarbon radicals of R in Component (d) are exemplified by alkyl radicals, such as methyl, ethyl, propyl, butyl, hexyl, and octyl; cycloaliphatic radicals, such as cyclohexyl; aryl radicals, such as phenyl, tolyl, and xylyl; aralkyl radicals, such as benzyl and phenylethyl. It is preferred that R is methyl or phenyl. The polydiorganosiloxanes of Component (d) are well known in the silicone art and need no detailed delineation herein.

Component (d), the hydroxyl-endblocked polydiorganosiloxane is typically present at levels of 5 to 80 weight percent of the total emulsion, and preferably from 20 to 60 weight percent of the total emulsion.

In another embodiment, this invention relates to an organopolysiloxane emulsion comprising: (A) a random organopolysiloxane polymer comprising

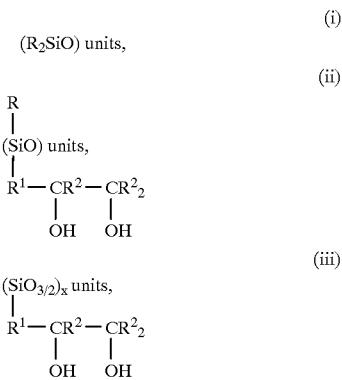

(iv) terminating units selected from at least two $(R^3{}_3SiO_{1/2})$ units, at least two (OH) units, or at least two units of a combination of $(R^3{}_3SiO_{1/2})$ units and (OH) units, and (v) optionally $(SiO_2)$ units wherein R is a monovalent hydrocarbon group having from 1 to 20 carbon atoms, $R^1$ is a divalent hydrocarbon group having from 1 to 20 carbon atoms, $R^2$ is independently selected from the group consisting of a hydrogen atom and R, $R^3$ is independently selected from the group consisting of R, a hydroxyl group, and a group having the formula

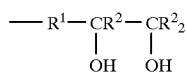

where $R^1$ and $R^2$ are as defined above, (i) has a value of 20 to 6000, (ii) has a value of 1 to 500, and (iii) has a value of 1 to 500, (iv) has a value of 2 to 50, and (v) has a value of 0 to 100, (B) at least one nonionic surfactant, (C) at least one anionic surfactant, and (D) water.

In the formula for component (A) above, R is a monovalent hydrocarbon group having from 1 to 20 carbon atoms. Suitable monovalent hydrocarbon groups are exemplified by alkyl groups, such as methyl, ethyl, propyl, butyl, hexyl, octyl, and decyl, cycloaliphatic groups, such as cyclohexyl; aryl groups, such as phenyl, tolyl, and xylyl, and aralkyl groups, such as benzyl and phenylethyl. It is preferred that the monovalent hydrocarbon radicals for R are methyl or phenyl. The R radicals can be identical or different, as desired.

The group $R^1$ is a divalent hydrocarbon group having from 1 to 20 carbon atoms which is exemplified by groups such as alkylene groups including methylene, ethylene, —CH$_2$(CH$_3$)CH—, propylene, —CH$_2$CH(CH$_3$)CH$_2$—, butylene, pentylene, trimethylene, 2-methyltrimethylene, pentamethylene, hexamethylene, 3-ethyl-hexamethylene, octamethylene, —(CH$_2$)$_{18}$—, and cycloalkylene radicals such as cyclohexylene, arylene radicals such as phenylene, combinations of divalent hydrocarbon radicals such as benzylene (—C$_6$H$_4$CH$_2$—), and oxygen containing groups such as —CH$_2$OCH$_2$—, —CH$_2$CH$_2$CH$_2$OCH$_2$—, —CH$_2$CH$_2$OCH$_2$CH$_2$—, —CH$_2$CH$_2$OCH(CH$_3$)CH$_2$—, and —CH$_2$OCH$_2$CH$_2$OCH$_2$CH$_2$—. Preferred alkylene groups are those having from 2 to 8 carbon atoms.

The group $R^2$ is independently selected from the group consisting of a hydrogen atom and R as described above. Preferably $R^2$ is independently selected from the group consisting of a hydrogen atom, methyl and phenyl.

In the formula for (A) above, preferably, (i) has a value of 200 to 2000, (ii) has a value of 2 to 50, (iii) has a value of 2 to 50, (iv) has a value of 2 to 20, and (v) has a value of 0 to 50.

The amount of component (A) in the organopolysiloxane emulsion of this invention is from 5 to 80 weight percent, and preferably from 20 to 60 weight percent of the total emulsion.

Component (B) above is at least one nonionic surfactant. The nonionic surfactants of (B) are as described above including preferred embodiments thereof. Preferably the nonionic surfactant of (B) is selected from the group consisting of 2,6,8 trimethyl-4-nonyloxypolyethylene oxyethanol (6EO) (sold as Tergitol® TMN-6 by Union Carbide Corp.), 2,6,8-trimethyl-4-nonyloxypolyethylene oxyethanol (10EO) (sold as Tergitol® TMN-10 by Union Carbide Corp.), alkyleneoxypolyethyleneoxyethanol (C 11–15, secondary alkyl, 7EO) (sold as Tergitol® 15-S-7 by Union Carbide Corp.), alkyleneoxypolyethyleneoxyethanol (C 11–15, secondary alkyl, 9EO) (sold as Tergitol® 15-S-9 by Union Carbide Corp.), alkyleneoxypolyethyleneoxyethanol (C 11–15, secondary alkyl, 15EO) (sold as Tergitol® 15-S-15 by Union Carbide Corp.), octylphenoxypolyethoxyethanol (40EO) (sold as Triton® X405 by Rohm and Haas Co.), nonylphenoxypolyethoxyethanol (10EO) (sold as Makon™ 10 by Stepan Co.), and polyoxyethylene-23-lauryl ether (sold as Brij® 35L by ICI Americas, Inc., Wilmington, Del. 19897).

The amount of component (B) in the silicone emulsion of this invention is from 0.1 to 10 weight percent, and preferably from 0.5 to 5 weight percent of the total emulsion.

Component (C) above is at least one anionic surfactant. The anionic surfactants of (C) are as described above including preferred embodiments thereof. Preferably the anionic surfactant of (C) is selected from the group consisting of dodecylbenzenesulfonic acid sold under the name Biosoft® S-100 by Stepan Co. and salts of dodecylbenzenesulfonic acid such as the sodium salt of dodecylbenzensulfonic acid sold under the name Siponate™ DS-10 by Alcolac Inc.

The amount of component (C) in the emulsion compositions of this invention is from 0.05 to 30 weight percent, and preferably from 2 to 10 weight percent of the total emulsion.

Component (D) is water and makes up the remainder of the emulsion composition of this invention. The amount of water in the compositions ranges from 30 to 90 weight percent, and preferably from 45 to 65 weight percent of the total emulsion.

The organopolysiloxane emulsions of the present invention may be in the form of a standard emulsion, a fine emulsion, or a microemulsion and may also contain optional ingredients, for example antifreeze additives, biocides, organic softeners, antistatic agents, preservatives, dyes and flame retardants. The preservatives are exemplified by Kathon® LX or Kathon® CG (both products are 5-chloro-2-methyl-4-isothiazolin-3-one from Rohm and Haas, Philadelphia, Pa. 19106), Giv-gard® DXN (6-acetoxy-2,4-dimethyl-m-dioxane from Givaudan Corp., Clifton, N.J. 07014), Tektamer® A.D. (from Calgon Corp., Pittsburgh, Pa. 152300), Nuosept® 91,95 (from Huls America, Inc., Piscataway, N.J. 08854), Germaben® (diazolidinyl urea and parabens from Sutton Laboratories, Chatham, N.J. 07928), Proxel® (from ICI Americas Inc., Wilmington, Del. 19897), methyl paraben, propyl paraben, sorbic acid, benzoic acid, and lauricidin. The above preservatives/biocides can be present in the organopolysiloxane emulsions up to the recommended maximum advised by the manufacturer and varies with each product The other optional components may comprise up to about 5 percent by weight of the total emulsion.

In another embodiment, this invention relates to a treated article obtained by a method comprising (I) applying to a substrate an organopolysiloxane emulsion wherein the organopolysiloxane emulsion comprises components (A)–(D) and any optional ingredients. Components (A)–(D) and the optional ingredients are as described hereinabove including preferred embodiments and amounts thereof.

The organopolysiloxane emulsions of this invention may be applied to the substrate by employing any suitable application technique, for example by padding or spraying, or from a bath. The concentration of the treating solution will depend on the desired level of application of siloxane to the substrate, and on the method of application employed, but it is believed that the most effective amount of organopolysiloxane emulsion should be in the range such that the substrate picks up the silicone composition at about 0.05% to 10% based on the weight of the substrate.

In this embodiment of the invention the substrate is preferably a fiber or fabric. The fibers usually in the form of tow, or knitted or woven fabrics, are immersed in the organopolysiloxane emulsion whereby the emulsion becomes selectively deposited on the fibers. The deposition of the organopolysiloxane emulsion on the fibers may also be expedited by increasing the temperatures of the bath with temperatures in the range of from 20° C. to 60° C. being generally preferred.

The organopolysiloxane emulsions of this invention can be employed for the treatment of substrates such as hair, animal fibers such as wool, cellulosic fibers such as cotton, and synthetic fibers such as nylon, polyester and acrylic fibers, or blends of these materials, for example, polyester/cotton blends, and may also be used in the treatment of leather, paper, paper pulp, tissues such as bath tissue or facial tissue. The fibers may be treated in any form, for example as knitted and woven fabrics and as piece goods. They may also be treated as agglomerations of random fibers as in filling materials for pillows and the like such as fiberfil.

In this embodiment of the invention the method can further comprise heating the substrate after step (I). Thus following the application of the organopolysiloxane emulsion to the substrate, the siloxane can then be cured. Preferably curing is expedited by exposing the treated fibers to elevated temperatures, preferably from 50 to 200° C.

The organopolysiloxane emulsion of this invention should be used at about 0.05 to 25 weight percent in the final bath for exhaust method applications, and about 5 gm/l to 80 gm/l in a padding method of application, and about 5 gm/l to 600 gm/l for a spraying application. The fibers or fabrics treated with the emulsions of this invention have superior slickness, have no oily feeling, and are soft to the touch.

In the examples hereinbelow, the viscosity was measured at 25° C. on a rotating spindle viscometer and the amounts are in weight percent unless otherwise indicated. The viscosities were measured in millipascal-seconds (mPa·s) (1 mPa·s=1 centipoise (cP)).

The 1,2-diol functional siloxane polymers of this invention were tested for viscosity in the following manner: one gram of $CaCl_2$ is dissolved in 10 grams of the emulsion, then 20 ml of methanol and 25 grams of pentane are added and the mixture is shaken briefly. The resulting mixture is then transferred to a 50 ml centrifuge tube and centrifuged for 15 minutes at 3000 RPM. The top pentane layer is removed with a disposable pipette, placed in an aluminum moisture dish and allowed to evaporate overnight. Residual pentane is then removed by vacuum at 10 mm of Hg for 20 minutes. The viscosity of the residue is then measured on a cone/plate viscometer.

The absorbency of the emulsions and microemulsions were tested according to AATCC Test Method 79-1986 (p. 106 of the AATCC Technical Manual, 1992). A drop of water is allowed to fall from a fixed height onto the taut surface of a test specimen (cloth or a smoothed out thick portion of yarn). The time required for the specular reflection of the water drop is measured and recorded as wetting time (in seconds).

These emulsions and microemulsions were then tested for relative hand value. The relative hand value was determined by a survey of panelists. The panelists first rank treated samples in order of increasing softness. This ranking is then repeated a number of times to insure reproducibility. Samples are then given ratings based on comparisons to the controls and each other. The rating scale is between 0 and 15 in increments of 1, with the lower numerical ratings indicating increased softness.

Particle size determinations were conducted on a Nicomp Model 370 submicron Particle Sizer (from Pacific Scientific, Silver Spring, Md. 20910) having a 632.8 nm laser light source using the principle of quasi-elastic light scattering and the cumulant method of D. E. Koppel (J. Chem. Phys., 57, 4814 (1972)).

EXAMPLE 1

The microemulsion of this example was prepared by modifying the emulsion polymerization method disclosed in EP0459500. To a 2 liter three-necked round bottom flask were added 41 wt % of water, 1.10 wt % of a 72% aqueous solution of polyoxyethylene-23-lauryl ether nonionic surfactant (Brij® 35L from ICI Americas, Inc., Wilmington, Del. 19897), and 9.4 wt % of dodecylbenzenesulfonic acid (Biosoft® S-100 from Stepan Chemical, Chicago, Ill.). The flask was then fitted with a glass rod/teflon paddle stirrer, reflux condenser, heating mantle and thermocouple attached to a temperature controller. The contents of the flask were stirred to dissolve the surfactants. The stirrer was set to approximately 300 RPM and the flask heated to 70° C. When the temperature was stable at 70° C., 20.19 wt % of octamethylcyclotetrasiloxane (hereinafter denoted D4) was slowly fed to the flask over 2 hours (first feed).

A second mixture was prepared by mixing 1.54 wt % of 3-glycidoxypropyltrimethoxysilane and 3.00 wt % of D4 and this mixture was then added to the flask. The flask was then held at 70° C. with stirring for 2.5 hours (the contents of the flask became a transparent yellow after 3 hours (second feed). The total time for the reaction was 4.5 hours. The flask was then cooled to 45° C. and stirred at this temperature for 2 hours. The reaction was neutralized by adding 9.40 wt % of 50% triethanolamine solution (50% active in water). Next, 14.34 wt % of water and 0.03 wt % of Kathon® CG (5-chloro-2-methyl-4-isothiazolin-3-one from Rohm and Haas) were then added.

The resulting organopolysiloxane microemulsion was 34 nanometers (nm) in particle size and had a percent transmittance of 81 at 580 nm wavelength as measured on a Spectronic™ 21 spectrophotometer. The organopolysiloxane polymer in the microemulsion had a tacky gel viscosity and contained 2 mole % of 1,2-diol functionality. The resulting compound was an organopolysiloxane polymer comprising

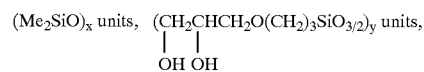

and y+2 silicon-bonded hydroxyl groups, wherein Me denotes methyl, and where the $SiO_{3/2}$ units were randomly distributed in the polymer having a branched structure. The ratio of x to y was 98:2.

This microemulsion was then tested for absorbency and hand as defined above. A comparison microemulsion was tested which was a microemulsion containing a trimethylsiloxy-endblocked dimethylsiloxane-(aminoethylaminopropyl)methylsiloxane copolymer and was denoted C1 in Table 1 below. The results in Table 1 below show that both microemulsions improve the hand of the fabric, but the aminosilicone rendered the fabric essentially hydrophobic. It is typical of polydimethylsiloxanes and aminopolysiloxanes to decrease the absorbency of fabric.

EXAMPLES 2–15

Examples 2–6 and 11–15 were prepared according to the procedure described in Example 1. The reaction temperature, weight percent of D4, weight percent of hexamethyldisiloxane (denoted HMDS), reaction time for the first feed are delineated in Table 2 below. The type of silane in secondary reaction which was either 3-glycidoxypropyltrimethoxysilane (Huls CG6720 from Huls America Inc., Bristol, Pa.), or 3-glycidoxypropylmethyldimethoxysilane (Huls CG6710 from Huls America Inc., Bristol, Pa.), weight percent of silane, and weight percent D4 for the second feed are delineated in Table 2 below. The total reaction time (first+ second feed) is also shown in Table 2. In examples 13 and 14, the HMDS was in the silane-D4 mixture which is added during the secondary reaction. In examples 13–15, the flask was then cooled to 25° C. instead of 45° C., and in Examples 2, 8, and 11, the flask was stirred for 220 minutes instead of 2 hours. Examples 3–6 were neutralized at 70° C. and were not further reacted at 45° C. as in Example 2.

The microemulsion of Example 7 was prepared by modifying the emulsion polymerization method disclosed in EP0459500. Example 7 was prepared in the following manner: to a 2 liter three-necked round bottom flask were added 41 wt % of water, 0.70 wt % of a 72% aqueous solution of polyoxyethylene-23-lauryl ether nonionic surfactant (Brij®35L from ICI), and 9.4 wt % of dodecylbenzenesulfonic acid (Biosoft® S-100). The flask was then fitted with a glass rod/teflon paddle stirrer, reflux condenser, heating mantle and thermocouple attached to a temperature controller. The contents of the flask were stirred to dissolve the surfactants. The stirrer was set to approximately 300 RPM and the flask heated to 70° C. When the temperature was stable at 70° C., 23.5 wt % of D4 and 1.50 wt % of 3-glycidoxypropyltrimethoxysilane was mixed together and slowly fed to the flask over 215 minutes. The flask was then held at 70° C. with stirring for 85 minutes. The total time for the reaction was 5 hours. The reaction was neutralized by adding 9.70 wt % of 50% triethanolamine solution (50% active in water). Next, 14.20 wt % of water was added. The resulting organopolysiloxane microemulsion had a particle size of 82 nanometers (nm). Example 8 was the same as Example 7, except that Example 8 was further reacted at 45° C. for 200 minutes.

The emulsion of Example 9 was prepared by modifying the emulsion polymerization method disclosed in EP0459500. Example 9 was prepared in the following manner: to a 2 liter three-necked round bottom flask were added 40 wt % of water, 3.9 wt % octylphenoxypolyethoxyethanol (40EO) (TRITON® X405 from Rohm and Haas Co.), and 3.0 wt % of dodecylbenzenesulfonic acid (Biosoft® S-100). The flask was then fitted with a glass rod/teflon paddle stirrer, reflux condenser, heating mantle and thermocouple attached to a temperature controller. The contents of the flask were stirred to dissolve the surfactants. The stirrer was set to approximately 300 RPM and the flask heated to 95° C. When the temperature was stable at 95° C., a mixture of 39 wt % of D4 and 1.50 wt % of 3-glycidoxypropyltrimethoxysilane was slowly fed to the flask over 225 minutes. The flask was then held at 95° C. with stirring for 135 minutes. The total time for the reaction was 6 hours. The reaction was neutralized by adding 3.00 wt % of 50% triethanolamine solution (50% active in water). Next, 9.55 wt % of water and 0.05 wt % of Kathon® CG were added. The resulting organopolysiloxane emulsion had a particle size of 258 nanometers (nm).

Example 10 was prepared by suspension emulsion polymerization in the following manner: An amount of 47 wt % of a hydroxyl terminated polydimethylsiloxane having a viscosity of 55 to 90 mm²/s at 25° C. and having a hydroxyl content of 1.0 to 2.5 wt % and 3 wt % of 3-glycidoxypropyltrimethoxysilane was dispersed in 10 wt % of a mixture of water and dodecylbenzenesulfonic acid using a typical laboratory mixer and stirring for 10 minutes. Additional water, about 36.32 wt %, was then slowly added, the dispersion mixed 10 minutes more and then subjected to high shear to emulsify by passing through a high pressure sonolator at 1700 psi pressure and then through a homogenizer at 7500 psi pressure. The resulting emulsion was stirred overnight at 25° C. to copolymerize the siloxane oligomer with the epoxy silane and to convert the epoxy group to a 1,2-diol pendant group in the polymer. The acid catalyst was then neutralized with 1.07 wt % of 50% triethanolamine solution (50% active in water) and 1.11 wt % of preservatives were also added to the emulsion. The emulsion had an average particle size of 293 nm.

The resulting emulsions and microemulsions were as follows: Examples 2–8 and 11–15 were microemulsions and Examples 9 and 10 were emulsions. Examples 2 and 3 had a particle size of 30 nm, Examples 4 had a particle size of 36 nm, Example 5 had a particle size of 38 nm, Example 6 had a particle size of 49 nm, Example 7 had a particle size of 82 nm, and Example 8 had a particle size of 83 nm. The Example 9 emulsion had a particle size of 258 nm, and the Example 10 emulsion had a particle size of 293 nm.

The organopolysiloxane polymer in Examples 1–3, and 7–12 had the same average formula as Example 1, except that in Example 9 the ratio of x to y was 99:1. The Example 11 organopolysiloxane polymer had a viscosity of greater than 2 million mPa·s at 25° C. and the Example 12 organopolysiloxane polymer had a viscosity of 340,000 mPa·s at 25° C.

The compound in Examples 4–6 and 13 was an organopolysiloxane polymer comprising

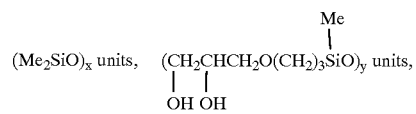

and 2 (Me)$_3$SiO$_{1/2}$ units, where Me denotes methyl and the SiO$_{3/2}$ units were randomly distributed in the polymer having a branched structure. The ratio of x to y was 98:2 for these examples. The Example 4 polymer had a viscosity of 18,200 mPa·s at 25° C., the Example 5 polymer had a viscosity of 4,020 mPa·s at 25° C., the Example 6 polymer had a viscosity of 1,770 mPa·s at 25° C., and the Example 13 polymer had a viscosity of 4,110 mPa·s at 25° C.

The compounds of Examples 14 and 15 were organopolysiloxane polymers comprising

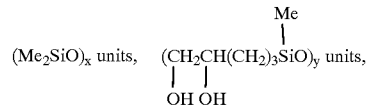

and 2 silicon-bonded hydroxyl groups. The ratio of x to y was 98:2 for this polymer. The Example 14 polymer had a viscosity of 1,120 mPa·s at 25° C., and the Example 15 polymer had a viscosity of 129,000 mPa·s at 25° C.

EXAMPLE 16

The emulsion of Example 16 was prepared by modifying the emulsion polymerization method disclosed in EP0459500. Example 16 was prepared in the following manner: to a 2 liter three-necked round bottom flask were added 40 wt % of water, 3.9 wt % octylphenoxypolyethoxyethanol (40EO) (TRITON® X405), and 3.0 wt % of dodecylbenzenesulfonic acid (Biosoft® S-100). The flask was then fitted with a glass rod/teflon paddle stirrer, reflux condenser, heating mantle and thermocouple attached to a temperature controller. The contents of the flask were stirred to dissolve the surfactants. The stirrer was set to approximately 300 RPM and the flask heated to 95° C. When the temperature was stable at 95° C., 39 wt % of D4 was slowly fed to the flask over 60 minutes (first feed).

A second mixture was prepared by mixing 1.50 wt % of 3-glycidoxypropyltrimethoxysilane and 9.55 wt % of water and this mixture was then added to the flask. The flask was then held at 95° C. with stirring for 320 minutes. The total time for the reaction was 435 minutes(second feed). The reaction was neutralized by adding 3.00 wt % of 50% triethanolamine solution (50% active in water). Next, 9.55 wt % of water and 0.05 wt % of Kathon® CG were then added. The resulting organopolysiloxane emulsion had a particle size of 192 nanometers (nm).

EXAMPLE 17

The emulsion of Example 17 was prepared by modifying the emulsion polymerization method of Findlay and Weyenberg disclosed in U.S. Pat. No. 3,294,725. A pre-emulsion was made by adding 39 wt % of D4 to a solution of 1.50 wt % of dodecylbenzenesulfonic acid in 45 wt % of water, mixing for 10 minutes, homogenizing the mixture at 7000 psi and again at 3000 psi to form a white emulsion. This pre-emulsion was divided into two portions for the following two experiments:

(a) To 85.00 wt % of the pre-emulsion prepared above was added 1.50 wt % of dodecylbenzenesulfonic acid and the emulsion heated in a flask with stirring to 80° C. and reacted for 2 hours to polymerize the cyclosiloxane and form polymer emulsion particles having a particle size of 188 nanometers. A premix of 1.50 wt % of 3-glycidoxypropyltrimethoxysilane in 4.60 wt % of water was then fed over one hour to the reaction medium and then reacted for one more hour. The catalyst was neutralized with 3.00 wt % of 50% triethanolamine solution (50% active in water) and 3.90 wt % of water was added to complete the formulation. The final particle size was 191 nanometers, indicating essentially no change in particle size.

(b) To 85.00 wt % of the pre-emulsion prepared above was added 1.50 wt % of dodecylbenzenesulfonic acid and a premix of 1.50 wt % of 3-glycidoxypropyltrimethoxysilane in 4.60 wt % of water. The emulsion was heated in a flask with stirring to 80° C. and reacted to polymerize the cyclosiloxane (D4) and the silane. After one hour at 80° C. the emulsion became gelatinous. The reaction could not be continued and the reaction was terminated. The reaction failed because the cyclosiloxane (D4) was not polymerized to form emulsion particles prior to addition and reaction of the silane.

It is also believed by the inventor that the process of Gravier and Tanaka in U.S. Pat. No. 4,999,398 can be modified to produce the 1,2-diol functional siloxane microemulsions of this invention. This method to make polydiorganosiloxane microemulsions involves first preparing an emulsion of the cyclosiloxane monomer in water using a surfactant and high shearing forces. This precursor emulsion is added, at a controlled rate, to a polymerization medium comprised of water and an effective amount of polymerization catalyst while mixing wherein the rate of addition of the precursor emulsion is effective to form a clear, stable microemulsion. During this process, the cyclosiloxane monomer particles are consumed and new much smaller polysiloxane polymer particles are formed. It is believed that this process could be modified to produce the 1,2-diol functional siloxane microemulsions of this invention by completing the above process steps, followed by feeding the epoxy functional alkoxysilane to the reaction medium at a controlled rate, then a sufficient reaction period to allow polymerization into the siloxane polymer particles. The catalyst is then neutralized.

Next, examples 2–10, a control (untreated fabric) and a comparison composition were tested for absorbency and hand as described hereinabove. In the absorbency test, the test specimen was either 100% cotton woven or 100% polyester woven, each of which are denoted in Table 3 below.

Next, examples 10, 11 12, and a control (untreated fabric), were tested for absorbency and hand as described hereinabove. In the absorbency test in Table 4, the test specimen was 100% cotton. The results are shown in Table 4 below.

Next, a control (untreated fabric), Examples 13–15, and a Comparison emulsion C2 which was an emulsion containing an epoxy functional siloxane, surfactants, and water were tested for Absorbency as described above, Soil Release as described below, and Hand as described above. For the Hand test in this example, there were 4 panelists ranking each fabric from best (1) to last in each set tested. The Soil Release was determined by the oil stain release method according to the procedures described in AATCC Test Method 130-1995 (p. 220 of the AATCC Technical Manual, 1996). The test method is designed to measure the ability of fabrics to release oily stains during home laundering. The test is conducted by applying a stain to a test specimen. An amount of the staining substance is forced into the fabric by using a specified weight. The stained fabric is then laundered in a prescribed manner and the residual stain rated on a scale of 5 to 1 by comparison with a stain release replica showing a graduated series of stains.

Unless otherwise indicated, the compositions were applied (padded on) onto the fabric in an amount of 1% silicone based on the weight of the fabric. The fabric was then dried at 150° C. for 3 minutes. The nonwoven fabrics were dried at 100° C. for 1 minute. The results of the tests are shown in Tables 5–7 below. Fabric A was 100% cotton knit, bleached, Fabric B was 100% cotton woven, Fabric C was 50% polyester and 50% cotton woven, Fabric D was 100% polyester, batiste filament, and Fabric E was 100% spun polypropylene.

TABLE 1

| Example | Polymer | Absorbency | Hand |
|---------|---------|------------|------|
| 1 | 1,2-Diol Siloxane | 4.5 sec. | Good |
| C1 | Amino Siloxane | >300 sec. | Excellent |

| | (First Feed) | | | (Second Feed) | | | |
|---|---|---|---|---|---|---|---|
| Ex | Temp (° C.) | Wt % D4 | Wt % HMDS | Time min. | Silane type | wt % silane | wt % D4 | Total Time |
| 2 | 70 | 17.5 | 0 | 110 | CG6720 | 1.5 | 6 | 300 |
| 3 | 70 | 17.5 | 0 | 110 | CG6720 | 1.5 | 6 | 300 |
| 4 | 70 | 20.09 | 0.1 | 100 | CG6720 | 1.54 | 3 | 240 |
| 5 | 70 | 19.99 | 0.2 | 90 | CG6720 | 1.54 | 3 | 360 |
| 6 | 70 | 19.89 | 0.3 | 100 | CG6720 | 1.54 | 3 | 360 |
| 7 | 70 | — | — | 215 | CG6720 | 1.5 | 23.5 | 300 |
| 8 | 70 | — | — | 215 | CG6720 | 1.5 | 23.5 | 300 |
| 9 | 95 | — | — | 225 | CG6720 | 1.5 | 39 | 360 |
| 10 | 25 | 47* | — | — | CG6720 | 3 | — | — |
| 11 | 70 | 17.19 | 0 | 95 | CG6720 | 1.54 | 6 | 335 |
| 12 | 70 | 17.19 | 0 | 95 | CG6720 | 1.54 | 6 | 300 |

TABLE 2-continued

| | (First Feed) | | | | (Second Feed) | | |
|---|---|---|---|---|---|---|---|
| Ex | Temp (°C.) | Wt % D4 | Wt % HMDS | Time min. | Silane type | wt % silane | wt % D4 | Total Time |
| 13 | 70 | 19.89 | .30 | 55 | CG6720 | 1.54 | 3 | 240 |
| 14 | 70 | 19.89 | .30 | 54 | CG6710 | 1.54 | 3 | 240 |
| 15 | 70 | 19.89 | 0 | 51 | CG6710 | 1.54 | 3 | 240 |

*-hydroxy-terminated polydimethylsiloxane

TABLE 3

| | 100% Cotton Woven | | 100% Polyester Woven | |
|---|---|---|---|---|
| Example | Absorbency (sec.) | Hand Rankings | Absorbency (sec.) | Hand Rankings |
| Control | 5.0 | 15 | 240–300 | 15 |
| 2 | 6.0 | 14 | 86.0 | 11 |
| 3 | 4.0 | 8 | 75.0 | 8 |
| 4 | 3.0 | 2 | 7.0 | 6 |
| 5 | 2.0 | 7 | 3.0 | 7 |
| 6 | 1.0 | 3 | 2.0 | 9 |
| 7 | 5.0 | 6 | 20.0 | 14 |
| 8 | 6.0 | 12 | 5.0 | 12 |
| 9 | 12.0 | 10 | 91.0 | 13 |
| 10 | 118.0 | 5 | 164.0 | 1 |

TABLE 4

FABRIC TYPE (100% COTTON)

| Example | Absorbency (sec.) | Absorbency after 1 wash (sec) |
|---|---|---|
| Control | 1 | 1 |
| 12 | 2.3 | 14.9 |
| 11 | 3.0 | 1 |
| 10 | 1 | 1 |

TABLE 5

INITIAL: (time in seconds)

| Fabric | Control | Ex. 13 | Ex. 14 | Ex. 15 | C2 |
|---|---|---|---|---|---|
| A | 0 | 2 | 0 | 2 | >120 |
| B | >120 | 2 | 1 | 3 | >120 |
| C | 45 | 2 | 1 | 3 | 100 |
| D | 3 | 1 | 0 | >120 | >120 |
| E | >120 | 0 | 0 | 0 | >120 |
| A* | 0 | 2 | 1 | 2 | 85 |
| B* | 0 | 2 | 25 | 28 | 4 |
| C* | 0 | 11 | 6 | 45 | 35 |
| D* | >120 | >120 | >120 | >120 | >120 |
| E* | >120 | 95 | >120 | 100 | >120 |

*time in seconds after 1 wash
(The best results are rated 5 indicating no staining)

TABLE 6

SOIL RELEASE

| Fabric | Control | Ex. 13 | Ex. 14 | Ex. 15 | C2 |
|---|---|---|---|---|---|
| A | 5.0 | 5.0 | 5.0 | 5.0 | 2.0 |
| B | 2.0 | 3.0 | 3.0 | 3.0 | 2.0 |
| C | 3.0 | 3.0 | 3.0 | 3.0 | 3.0 |
| D | 3.0 | 4.0 | 4.0 | 4.0 | 2.0 |
| E | 1.0 | 1.0 | 1.0 | 1.0 | 1.0 |

TABLE 7

HANDLE RATING (1 (BEST)–7 (WORST))

| Fabric | Rater | Ex. 13 | Ex. 14 | Ex. 15 | C2 |
|---|---|---|---|---|---|
| A | 1 | 6 | 7 | 4 | 3 |
|   | 2 | 3 | 7 | 1 | 6 |
|   | 3 | 1 | 7 | 6 | 4 |
|   | 4 | 5 | 7 | 4 | 6 |
| Ave. |   | 3.75 | 7.00 | 3.75 | 4.75 |
| B | 1 | 6 | 7 | 5 | 1 |
|   | 2 | 7 | 2 | 1 | 4 |
|   | 3 | 3 | 6 | 5 | 4 |
|   | 4 | 5 | 7 | 6 | 3 |
| Ave. |   | 5.25 | 5.50 | 4.25 | 3.00 |
| C | 1 | 2 | 5 | 7 | 4 |
|   | 2 | 3 | 6 | 1 | 4 |
|   | 3 | 1 | 2 | 7 | 3 |
|   | 4 | 3 | 7 | 5 | 2 |
| Ave. |   | 2.25 | 5.00 | 5.00 | 3.25 |
| D | 1 | 7 | 6 | 5 | 2 |
|   | 2 | 5 | 2 | 7 | 1 |
|   | 3 | 4 | 6 | 5 | 3 |
|   | 4 | 4 | 7 | 5 | 2 |
| Ave. |   | 5.00 | 5.25 | 5.50 | 2.00 |
| E | 1 | 7 | 2 | 4 | 3 |
|   | 2 | 7 | 5 | 1 | 4 |
|   | 3 | 1 | 4 | 2 | 3 |
| Ave. |   | 5.00 | 3.67 | 2.33 | 3.33 |

It is apparent from Table 6 that Examples 13, 14, and 15 did not cause staining and in some cases actually improved the soil release properties of the fabric. Tables 5 and 7 illustrate that Examples 13, 14, and 15 of this invention provide improvement in softening (handle) over the untreated substrate and retain excellent absorbency in contrast to the epoxy siloxane-containing emulsion which provides softening but severely decreases absorbency (increased wetting time to greater than 120 seconds in general). It is believed that the conversion of the epoxy group to a diol group during the emulsion process provides this unique absorbency that the epoxy group cannot provide.

That which is claimed is:

1. An organopolysiloxane emulsion comprising:

(A) a random organopolysiloxane polymer comprising (i) $(R_2SiO)$ units, (ii)

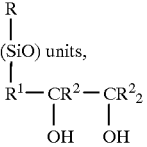

(SiO) units,

-continued $$\begin{matrix} (SiO_{3/2})_x \text{ units,} \\ | \\ R^1-CR^2-CR^2_2 \\ | \quad | \\ OH \quad OH \end{matrix} \quad \text{(iii)}$$

(iv) terminating units selected from at least two $(R^3{}_3SiO_{1/2})$ units, at least two (OH) units, or at least two units of a combination of $(R^3{}_3SiO_{1/2})$ units and (OH) units, and (v) optionally $(SiO_2)$ units wherein R is a monovalent hydrocarbon group having from 1 to 20 carbon atoms, $R^1$ is a divalent hydrocarbon group having from 1 to 20 carbon atoms, $R^2$ is independently selected from the group consisting of a hydrogen atom and R, $R^3$ is independently selected from the group consisting of R, a hydroxyl group, and a group having the formula $$-R^1-CR^2-CR^2_2 \\ | \quad | \\ OH \quad OH$$

where $R^1$ and $R^2$ are as defined above, (i) has a value of 20 to 6000, (ii) has a value of 1 to 500, and (iii) has a value of 1 to 500, (iv) has a value of 2 to 50, and (v) has a value of 0 to 100;

(B) at least one nonionic surfactant;
(C) at least one anionic surfactant; and
(D) water.

2. An emulsion according to claim 1, wherein $R^1$ is selected from the group consisting of methylene, ethylene, —CH₂ CH(CH₃)—, propylene, —CH₂CH(CH₃)CH₂—, butylene, pentylene, trimethylene, 2-methyltrimethylene, pentamethylene, hexamethylene, 3-ethyl-hexamethylene, octamethylene, —(CH₂)₁₈—, cyclohexylene, phenylene, benzylene, —CH₂OCH₂—, —CH₂CH₂CH₂OCH₂—, —CH₂CH₂OCH₂CH₂—, —CH₂CH₂OCH(CH₃)CH₂—, and —CH₂OCH₂CH₂OCH₂CH₂—.

3. An emulsion according to claim 1, wherein $R^2$ is independently selected from the group consisting of a hydrogen atom, methyl, and phenyl.

4. An emulsion according to claim 1, wherein (B) is selected from the group consisting of polyoxyethylene alkyl ethers, polyoxyethylene alkylphenol ethers, polyoxyethylene lauryl ethers, polyoxyethylene sorbitan monoleates, polyoxyethylene alkyl esters, polyoxyethylene sorbitan alkyl esters, polyethylene oxide-polypropylene oxide block copolymers, diethylene glycol, ethoxylated trimethylnonanols, and polyoxyalkylene glycol modified polysiloxane surfactants.

5. An emulsion according to claim 1, wherein (B) is selected from the group consisting of 2,6,8 trimethyl-4-nonyloxypolyethylene oxyethanol, polyoxyethylene-23-lauryl ether, alkyleneoxypolyethyleneoxyethanol, octylphenoxypolyethoxyethanol, and nonylphenoxypolyethoxyethanol.

6. An emulsion according to claim 1, wherein (C) is selected from the group consisting of alkali metal sulforicinates, sulfonated glyceryl esters of fatty acids, salts of sulfonated monovalent alcohol esters, amides of amino sulfonic acids, sulfonated products of fatty acids, nitrites, sulfonated aromatic hydrocarbons, condensation products of naphthalene sulfonic acids with formaldehyde, sodium octahydroanthracene sulfonate, alkali metal alkyl sulfates, ether sulfates having alkyl groups of 8 or more carbon atoms, alkylarylsulfonates having 1 or more alkyl groups of 8 or more carbon atoms, alkylbenzenesulfonic acids, salts of alkylbenzenesulfonic acids, sulfuric esters of polyoxyethylene alkyl ether, sodium salts of alkylnaphthylsulfonic acid, potassium salts of alkylnaphthylsulfonic acid, and amine salts of alkylnaphthylsulfonic acid.

7. An emulsion according to claim 1, wherein (C) is selected from the group consisting of dodecylbenzenesulfonic acid and the sodium salt of dodecylbenzensulfonic acid.

8. A treated article obtained by a method comprising:

(I) applying to a substrate an organopolysiloxane emulsion wherein the organopolysiloxane emulsion comprises:

(A) a random organopolysiloxane polymer comprising $$(R_2SiO) \text{ units,} \quad \text{(i)}$$

$$\begin{matrix} R \\ | \\ (SiO) \text{ units,} \\ | \\ R^1-CR^2-CR^2_2 \\ | \quad | \\ OH \quad OH \end{matrix} \quad \text{(ii)}$$

$$\begin{matrix} (SiO_{3/2})_x \text{ units,} \\ | \\ R^1-CR^2-CR^2_2 \\ | \quad | \\ OH \quad OH \end{matrix} \quad \text{(iii)}$$

(iv) terminating units selected from at least two $(R^3{}_3SiO_{1/2})$ units, at least two (OH) units, or at least two units of a combination of $(R^3{}_3SiO_{1/2})$ units and (OH) units, and (v) optionally $(SiO_2)$ units wherein R is a monovalent hydrocarbon group having from 1 to 20 carbon atoms, $R^1$ is a divalent hydrocarbon group having from 1 to 20 carbon atoms, $R^2$ is independently selected from the group consisting of a hydrogen atom and R, $R^3$ is independently selected from the group consisting of R, a hydroxyl group, and a group having the formula $$-R^1-CR^2-CR^2_2 \\ | \quad | \\ OH \quad OH$$

where $R^1$ and $R^2$ are as defined above, (i) has a value of 20 to 6000, (ii) has a value of 1 to 500, and (iii) has a value of 1 to 500, (iv) has a value of 2 to 50, and (v) has a value of 0 to 100;

(B) at least one nonionic surfactant;
(C) at least one anionic surfactant; and
(D) water.

9. An article according to claim 8, wherein the substrate is selected from the group consisting of wool, cotton, nylon, polyester, acrylic fibers, polyester-cotton blends, leather, paper, paper pulp, bath tissue, facial tissue, and fiberfil.

10. An article according to claim 8, wherein the method further comprises heating the substrate after step (I).

* * * * *